(12) United States Patent
Suzuki et al.

(10) Patent No.: US 11,431,003 B2
(45) Date of Patent: Aug. 30, 2022

(54) SEPARATOR ASSEMBLY USED FOR FUEL CELL

(71) Applicants: NOK CORPORATION, Tokyo (JP); Honda Motor Co., Ltd., Tokyo (JP)

(72) Inventors: Kento Suzuki, Shizuoka (JP); Kentaro Ishida, Saitama (JP); Kazuo Nunokawa, Saitama (JP); Akihito Giga, Saitama (JP)

(73) Assignees: NOK CORPORATION; Honda Motor Co., Ltd.

( * ) Notice: Subject to any disclaimer, the term of this patent is extended or adjusted under 35 U.S.C. 154(b) by 64 days.

(21) Appl. No.: 17/130,135

(22) Filed: Dec. 22, 2020

(65) Prior Publication Data

US 2021/0194020 A1    Jun. 24, 2021

(30) Foreign Application Priority Data

Dec. 23, 2019   (JP) .............................. JP2019-231102

(51) Int. Cl.
*H01M 8/0276* (2016.01)
*H01M 8/0206* (2016.01)
*H01M 8/0258* (2016.01)

(52) U.S. Cl.
CPC ....... *H01M 8/0276* (2013.01); *H01M 8/0206* (2013.01); *H01M 8/0258* (2013.01)

(58) Field of Classification Search
None
See application file for complete search history.

(56) References Cited

U.S. PATENT DOCUMENTS

2005/0249996 A1\* 11/2005 Meacham ........... H01M 8/2457
429/513
2011/0318665 A1\* 12/2011 Yamamoto ............ H01M 8/242
429/469
2017/0222247 A1    8/2017 Sakano et al.

FOREIGN PATENT DOCUMENTS

JP          2017-139218 A       8/2017

\* cited by examiner

*Primary Examiner* — Helen Oi K Conley
(74) *Attorney, Agent, or Firm* — Harness, Dickey & Pierce, P.L.C.

(57) ABSTRACT

A separator assembly used for a fuel cell includes one pair of metal separators joined together and including a bead seal section including one pair of seal bead portions projecting in opposite directions respectively, an elastic body disposed in the bead seal section, and a first communication hole which extends through the separator assembly in a thickness direction of the separator assembly and which allows a reaction gas or a coolant to flow through the separator assembly. The bead seal section is disposed along an outer periphery of the separator assembly and along a shape of the first communication hole. The elastic body of a predetermined length is disposed in the bead seal section.

20 Claims, 5 Drawing Sheets

SEPARATOR ASSEMBLY USED FOR FUEL CELL

CROSS REFERENCE TO RELATED APPLICATIONS

This application claims the foreign priority benefit under 35 U.S.C. § 119 of Japanese patent application No. 2019-231102 filed on Dec. 23, 2019, the entire disclosure of which is incorporated herein by reference.

BACKGROUND OF THE INVENTION

1. Field of the Invention

The present invention relates to a separator assembly used for a fuel cell.

2. Description of the Related Art

For example, Japanese Patent Application Publication No. 2017-139218 (Patent Literature 1) discloses a fuel cell including separator assemblies.

The fuel cell includes a membrane electrode assembly and one pair of separator assemblies between which the membrane electrode assembly is held (see Patent Literature 1).

Figure 6:
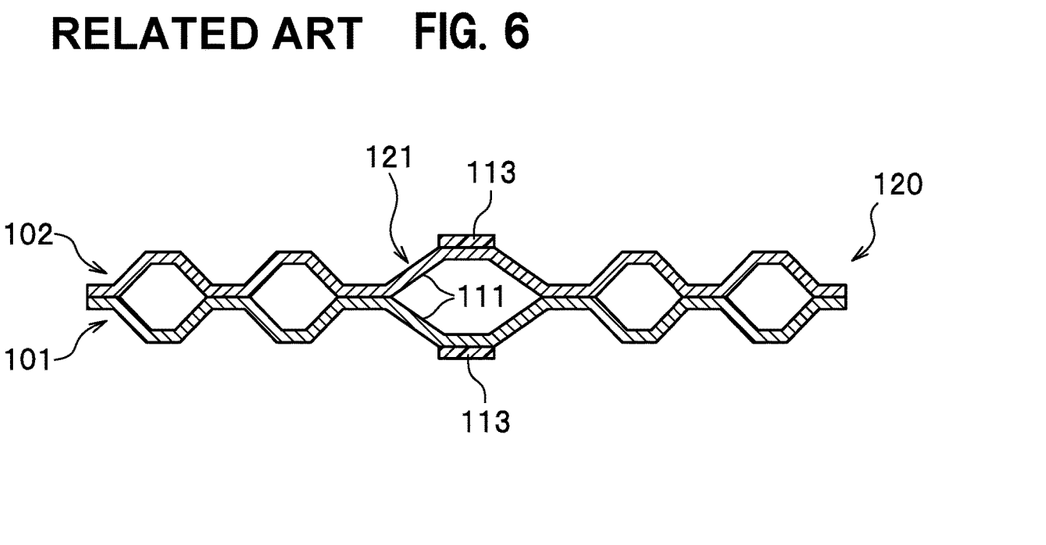
FIG. 6 is a cross-sectional view illustrating an example of a separator assembly related to Patent Literature 1.

FIG. 6 is a cross-sectional view illustrating an example of a separator assembly related to Patent Literature 1. As illustrated in FIG. 6, a separator assembly 120 is formed by joining a first metal separator 101 and a second metal separator 102. The first metal separator 101 and the second metal separator 102 include projecting seal bead portions 111. Surfaces of the first metal separator 101 and the second metal separator 102 on the sides opposite to the sides on which their respective seal bead portions 111 project are joined together. Seal members 113 are provided on distal ends of the seal bead portions 111.

In the separator assembly 120, a bead seal section 121 includes the seal bead portions 111 and 111. One pair of separator assemblies 120 and 120 are capable of preventing leakage of reaction gas such as fuel gas and oxidant gas with an electrolyte membrane or a resin film around an outer periphery of the electrolyte membrane held between and sealed by the bead seal sections 121 and 121 facing each other.

The bead seal section 121 ensures the sealing performance by using the reaction force of the projecting seal bead portions 111 and the followability of the sealing members 113. However, the reaction force of the seal bead portions 111 may vary from location to location due to an error in the cross-sectional shape of the seal bead portions 111 (the bead seal section 121) and the influence of a seal line shape (the shape of the bead seal section 121 in plan view). In the bead seal section 121, a variation of the reaction force leads to a variation of surface pressure, and resultantly may affect the sealing performance.

SUMMARY OF THE INVENTION

The present invention was made in response to the aforementioned issue, and has an object to provide a separator assembly used for a fuel cell, which is capable of equalizing sealing performance by suppressing a variation of surface pressure in a bead seal section.

In response to the aforementioned issue, A separator assembly used for a fuel cell includes one pair of metal separators joined together and including a bead seal section including one pair of seal bead portions projecting in opposite directions respectively, an elastic body disposed in the bead seal section, and a first communication hole which extends through the separator assembly in a thickness direction of the separator assembly and which allows a reaction gas or a coolant to flow through the separator assembly. The bead seal section is disposed along an outer periphery of the separator assembly and along a shape of the first communication hole. The elastic body of a predetermined length is disposed in the bead seal section.

According to the separator assembly, the reaction force of the elastic body provided inside the bead seal section enhances the surface pressure at a portion with a low reaction force. This makes it possible to reduce a location variation of the surface pressure of the bead seal section, and as a result ensure the desired surface pressure over the entire periphery (entire length) of the bead seal section.

According to the separator assembly of the present invention, it is possible to reduce a variation of the surface pressure in the bead seal section, and therefore equalize the surface pressure.

DETAILED DESCRIPTION OF THE EMBODIMENTS

Figure 1:
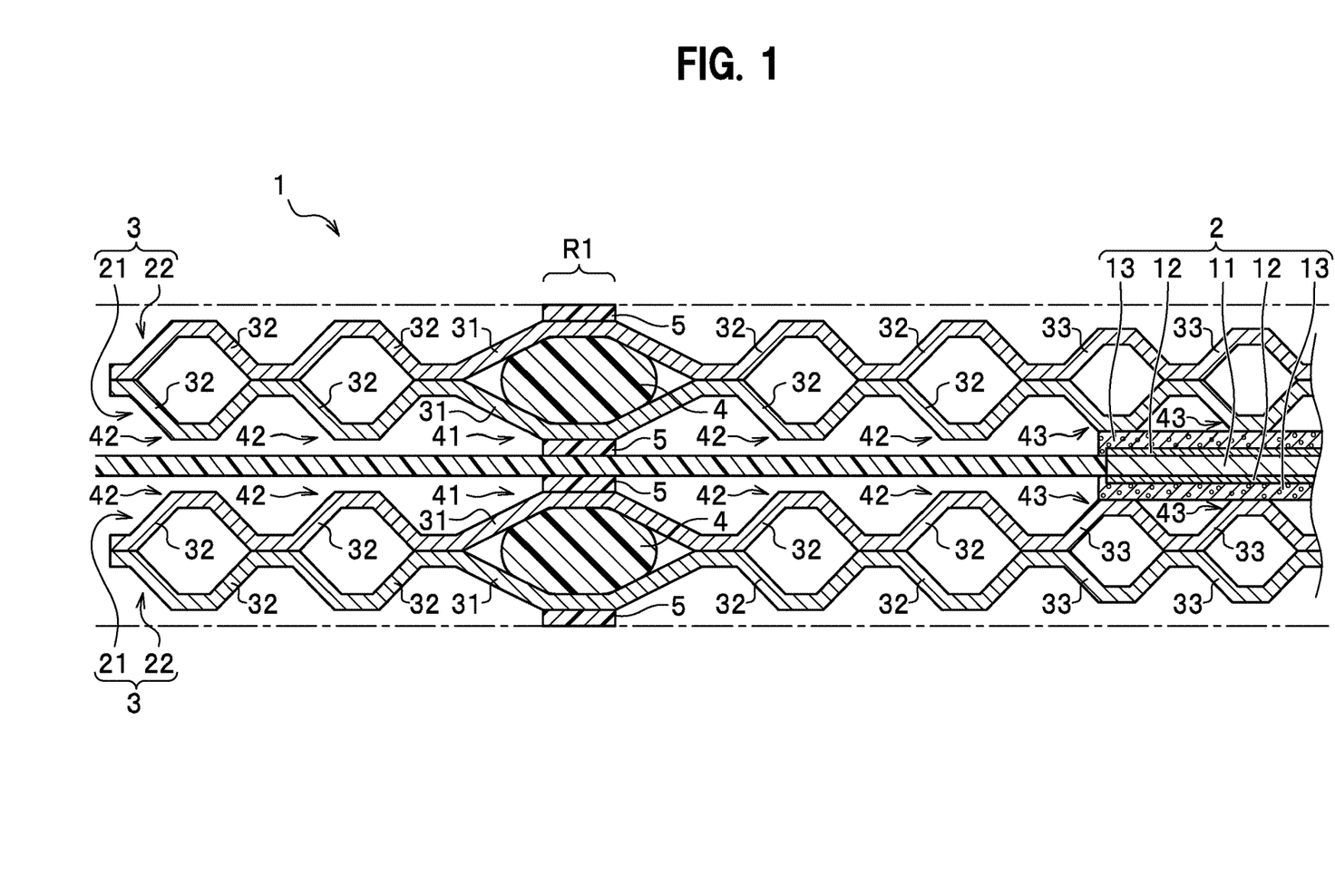
FIG. 1 is a cross-sectional view of a separator assembly used for a fuel cell according to Example 1.

With reference to the accompanying drawings, detailed description is given of a separator assembly used for a fuel cell and a manufacturing method thereof according to embodiments. As illustrated in FIG. 1, a fuel cell 1 includes a membrane electrode assembly 2, and one pair of separator assemblies 3 and 3 used for a fuel cell between which the membrane electrode assembly 2 is held.

Each of the separator assemblies 3 used for a fuel cell includes a bead seal section 41 including one pair of seal bead portions 31 and 31 that project in opposite directions respectively and that are elastically deformable due to a compressing load in a plate-thickness direction, and an elastic body 4 disposed in the bead seal section 41.

In a method of manufacturing a separator assembly used for a fuel cell according to the present embodiment, a separator assembly 3 used for a fuel cell is formed by joining a first metal separator 21 and a second metal separator 22 together while the first metal separator 21 and the second metal separator 22 are abutted each other on their surfaces on the sides opposite to the sides on which their respective seal bead portions 31 project and the elastic body 4 is disposed between the one pair of the seal bead portions 31. Thus, the reaction force of the elastic body 4 in the bead seal section 41 formed by joining the seal bead portions 31 together makes it possible to enhance the surface pressure at a portion with a low reaction force, and ensure a desired surface pressure. Hereinafter, Examples will be described in detail.

Example 1

The fuel cell 1 is a member that generates power through chemical reaction between hydrogen (fuel gas) supplied from an anode side and oxygen (oxidant gas) supplied from a cathode side. A fuel cell stack is formed by arranging multiple fuel cells 1 side by side and applying a predetermined compressing load to the fuel cells 1 in a thick direction thereof. FIG. 1 illustrates the fuel cell 1 under the condition where a predetermined compressing load is applied.

The membrane electrode assembly (MEA) 2 includes an electrolyte membrane 11, electrode catalyst layers 12 and 12, and gas diffusion layers 13 and 13. The electrolyte membrane 11 spreads outside the gas diffusion layers 13. Here, a portion of the electrolyte membrane 11 spreading outside the gas diffusion layers 13 may be a resin film (resin flame member) in some cases.

The separator assemblies 3 are plate-shaped members arranged on one and the other sides (the lower and upper sides in FIG. 1) of the membrane electrode assembly 2. One pair of separator assemblies 3 and 3 used for a fuel cell which hold the membrane electrode assembly 2 from above and below often have the same shape and structure.

Each separator assembly 3 used for a fuel cell includes a bead seal section 41 forming a seal region R1 and multiple stopper sections 42 arranged side by side with the bead seal section 41. The stopper sections 42 are sections that, when a disturbance (such as a temperature change or collision) occurs on a stack, give support to prevent the bead seal section 41 from being deformed excessively beyond a preset maximum compression amount (receive the load due to the disturbance).

The bead seal section 41 projects toward the electrolyte membrane 11 and is formed, for example, in an endless form along the entire outer periphery of the fuel cell 1. In the present example, only one bead seal section 41 is provided, but two or more bead seal sections 41 may be provided. The elastic body 4 is provided in the bead seal section 41. In addition, seal members 5 are provided on distal ends of the bead seal section 41.

The elastic body 4 is installed in the bead seal section 41 intermittently or continuously in an extension direction. The elastic body 4 is a member made of ethylene propylene diene rubber (EPDM) and having a circular cross section with a diameter (line diameter) of about 1 mm. The line diameter of the elastic body 4 may be determined as appropriate depending on the space height, the volume rate, or the like of the compressed bead seal section 41. Here, a material for forming the elastic body 4 is not limited to ethylene propylene diene rubber (EPDM) and, for example, silicone rubber (VMQ), fluororubber (FKM), or the like may be used.

The seal members 5 include an elastic material, and are flat gaskets having rectangular cross sections in the present example. The seal members 5 may include a material having elasticity. For example, ethylene propylene diene rubber (EPDM), silicone rubber (VMQ), fluororubber (FKM), polyisobutylene (PIB), SIFEL (registered trademark, Shin-Etsu Chemical Co., Ltd.), a resin, or the like may be used. The seal members 5 are installed intermittently or continuously in the extension direction of the bead seal section 41.

The multiple stopper sections 42 project toward the electrolyte membrane 11 and contact with the electrolyte membrane 11 without receiving a compressing load or face the electrolyte membrane 11 across a slight space. The stopper sections 42 are each extended in a linear form or curved form along the extension direction of the bead seal section 41.

The seal region R1 is configured in such a way that the bead seal section 41 of the separator assembly 3 on one side (the lower side in FIG. 1) and the bead seal section 41 of the separator assembly 3 on the other side (the upper side in FIG. 1) hold the electrolyte membrane 11 (or a resin flame) in between. The seal region R1 makes it possible to prevent leakage of reaction gas such as fuel gas and oxidant gas.

In addition, rib portions 33, 33 in each of the separator assemblies 3 form a reaction surface or channel portion 43. The reaction surface or channel portion 43 of the separator assembly 3 on the one side and the reaction surface or channel portion 43 of the separator assembly 3 on the other side hold the membrane electrode assembly 2 (the gas diffusion layers 13 and 13) in between, thereby forming a reaction region through which the reaction gas flows.

Next, a method of manufacturing the fuel cell 1 according to the present example will be described. The method of manufacturing the fuel cell 1 includes the method of manufacturing a separator assembly used for a fuel cell and includes a separator forming step, an elastic body placing step, a separator assembly forming step, an assembling step, and a compressing step.

The separator forming step is a step of forming the first metal separator 21 and the second metal separator 22. The first metal separator 21 and the second metal separator 22 have the same external shape. In the separator forming step, a flat metal thin plate (material) having a thickness of about 0.07 to 0.20 mm is press-formed to form the first metal separator 21 and the second metal separator 22.

Figure 2:
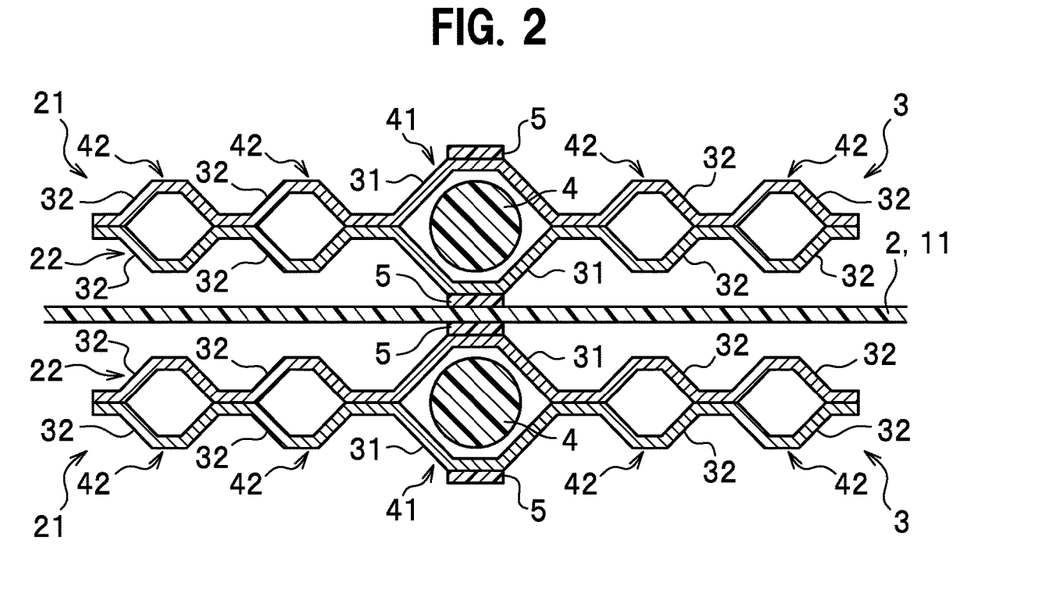
FIG. 2 is a cross-sectional view of the separator assembly according to Example 1 before assembling.

The first metal separator 21 includes one projecting seal bead portion 31 and multiple projecting stopper bead portions 32 (two stopper bead portions on each side of the seal bead portion 31 in the present example) (see FIG. 2). Both of the seal bead portion 31 and the stopper bead portions 32 are in full bead shapes. The full bead shape refers to a seal bead structure for a gasket in which a bead having a trapezoidal cross section or an arc cross section is provided between flat surface portions having the same height. A projecting height of the stopper bead portions 32 in the plate-thickness direction is lower than that of the seal bead portion 31. Here, the numbers and layout of the seal bead portion 31 and the stopper bead portions 32 are just an example, and may be set as appropriate.

Figure 3:
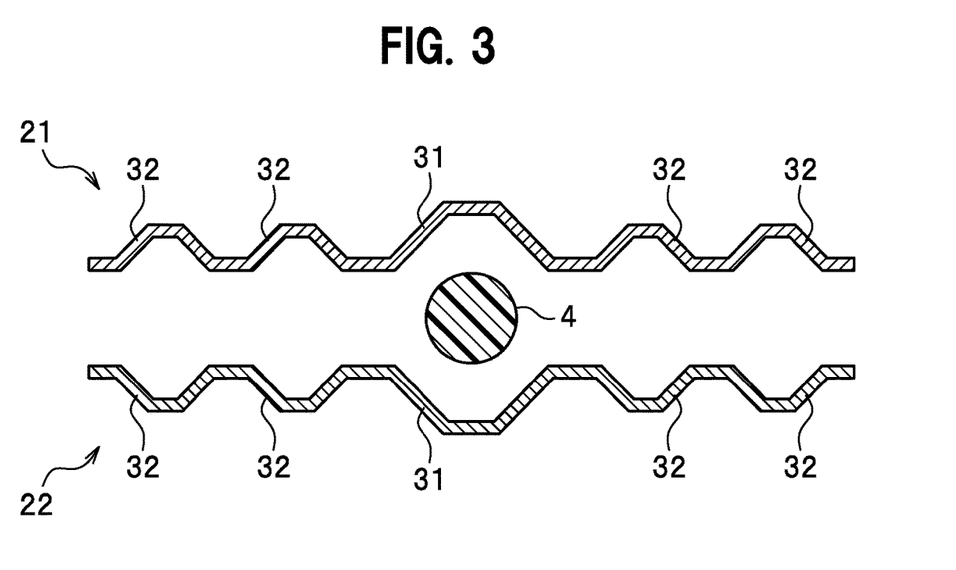
FIG. 3 is a cross-sectional view illustrating an elastic body placing step in a method of manufacturing a separator assembly used for a fuel cell.

The elastic body placing step is a step of placing the elastic body 4 between one pair of seal bead portions 31 and 31. In the elastic body placing step, as illustrated in FIG. 3, the elastic body having a circular cross section 4 is disposed between the seal bead portions 31 while the surfaces of the first metal separator 21 and the second metal separator 22 on the sides opposite to the sides on which their respective seal bead portions 31 project are abutted each other. In other words, the elastic body 4 is disposed in the bead seal section 41 including one pair of seal bead portions 31 and 31 projecting in the opposite directions respectively.

The separator assembly forming step is a step of forming the separator assembly 3. In the separator assembly forming step, as illustrated in FIG. 2, the separator assembly 3 is formed by joining the first metal separator 21 and the second metal separator 22 together while the elastic body 4 is held between the seal bead portions 31. The first metal separator 21 and the second metal separator 22 are united by brazing, swaging, welding, or the like along their outer peripheries and around first communication holes (see first communication holes 61 in FIG. 4).

The bead seal section 41 including the seal bead portions 31 and 31 includes a hollow cavity. In the hollow cavity of the bead seal section 41, the elastic body 4 is disposed. The seal members 5 and 5 are attached to both ends (the upper and lower surfaces in FIG. 1) of the bead seal section 41. Then, each stopper section 42 including the stopper bead portions 32 and 32 also includes a hollow cavity.

As illustrated in FIG. 2, the assembling step is a step of holding the membrane electrode assembly 2 (the electrolyte membrane 11) between one pair of separator assemblies 3 and 3 used for a fuel cell.

The compressing step is a step of forming a fuel cell stack (fuel cells 1) by arranging multiple assembled fuel cells 1 side by side and applying a predetermined compressing load to the fuel cells (see FIG. 1). When the electrolyte membrane 11 is held between the bead seal sections 41 with a predetermined load, the seal region R1 is formed. The stopper sections 42 and the electrolyte membrane 11 contact with each other or face each other across a slight space. As illustrated in FIG. 1, when a compressing load is applied to the fuel cell 1, the bead seal section 41 is compressed. Along with the compression of the bead seal section 41, the elastic body 4 is compressed into a substantially elliptic shape while being in close contact with the inner surface (at least the upper and lower surfaces) of the bead seal section 41. The elastic modulus of the elastic body 4 is higher than the elastic modulus of the seal bead portions 31. The compressed elastic body 4 is desirably filled in the bead seal section 41 at about 80 to 90% of the bead cross-sectional area.

Next, an operation and effects of the present example will be described.

According to the separator assembly 3 in the present example, the reaction force of the elastic body 4 provided and compressed in the bead seal section 41 enhances the surface pressure at a portion with a low reaction force, and thereby suppresses a local variation of surface pressure in the bead seal section 41.

In addition, when a disturbance (such as a temperature change or collision) occurs on a stack, the stopper sections 42 and 42 included in the separator assembly can give support to prevent the bead seal section 41 from being deformed excessively beyond a preset maximum compression amount. This enables the bead seal section 41 to have a stable surface pressure and thereby achieve a desired sealing surface pressure stably.

The embodiment and the example are described above, but may be modified in design as appropriate. The aforementioned stopper sections 42 are arranged on both sides of the electrolyte membrane 11, but may be arranged only on one of the sides or be arranged only in one row.

Example 2

Figure 4:
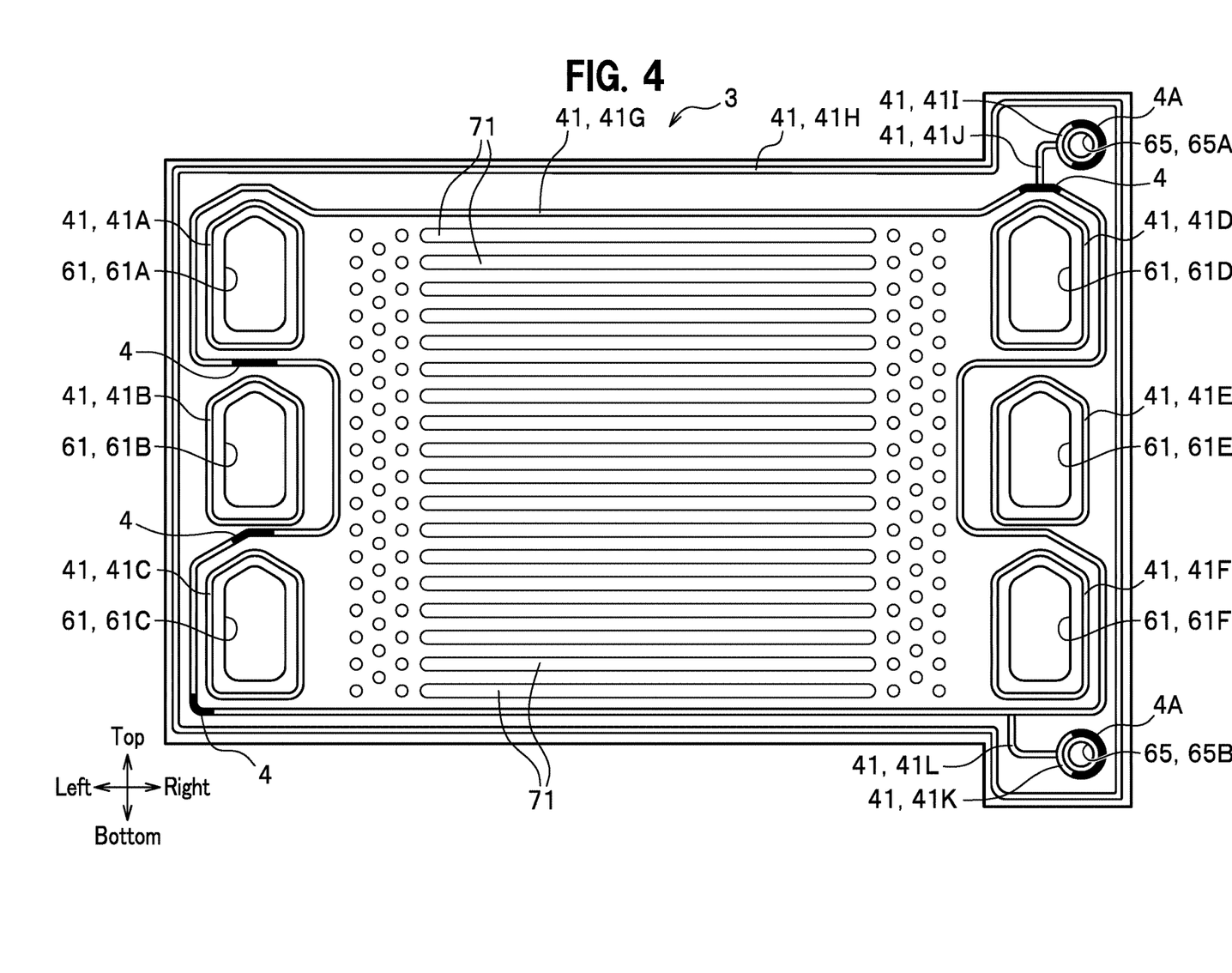
FIG. 4 is a plan view of a separator assembly used for a fuel cell according to Example 2.
Figure 5A:
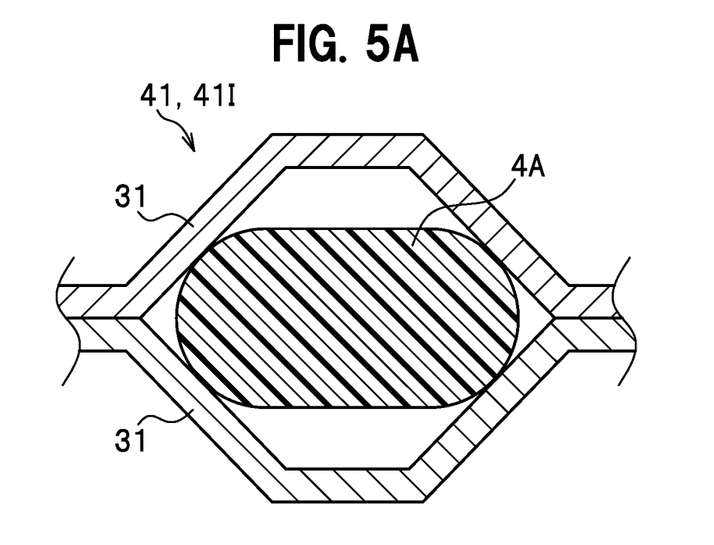
FIG. 5A is a cross-sectional view of a bead seal section disposed around a second communication hole in the separator assembly according to Example 2 before assembling.
Figure 5B:
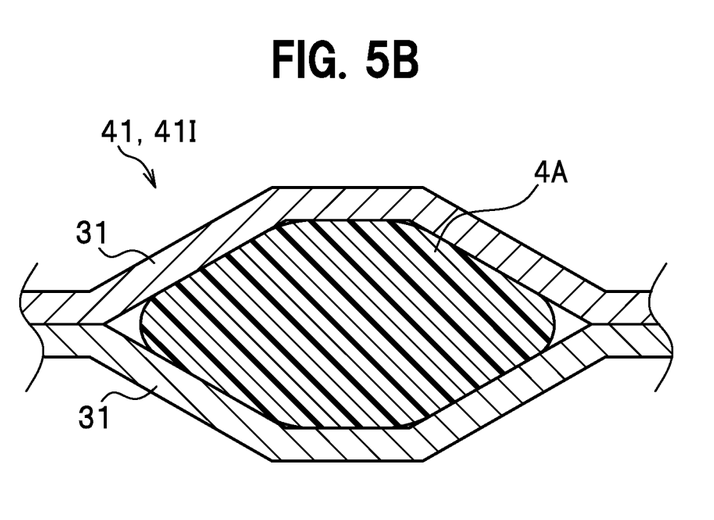
FIG. 5B is a cross-sectional view of the bead seal section disposed around the second communication hole in the separator assembly according to Example 2 after compressing load application.

In Example 2 illustrated in FIGS. 4, 5A, and 5B, description is given of an example of layout locations of elastic bodies 4 and 4A in a separator assembly 3 used for a fuel cell. For convenience of description, "top and bottom" and "right and left" in FIG. 4 follow arrows in FIG. 4.

As illustrated in FIG. 4, the separator assembly 3 in Example 2 includes multiple bead seal sections 41, multiple elastic bodies 4 and 4A, multiple first communication holes 61, and multiple second communication holes 65.

The first communication holes 61 are holes which extend through the separator assembly in the thickness direction of the separators and which allows a reaction gas or a coolant to flow through the separator assembly 3. The shape of each first communication hole 61 is a polygonal shape in the present example, but may be any other shape such as a circular shape or an elliptic shape. The number of the first communication holes 61 is not particularly limited. In the present example, three holes (first communication holes 61A to 61C) are disposed on the left side and three holes (first communication holes 61D to 61F) are disposed on the right side of the separator assembly 3.

For example, the first communication holes 61 are configured such that the reaction gas flowing in from the first communication hole 61A disposed on the left side flows through reaction gas channels 71 disposed in the center of the separator assembly and is consumed by chemical reaction at the electrode catalyst layers 12 in the membrane electrode assembly 2 (see FIG. 1) for power generation, and that the consumed reaction gas flows through the reaction gas channels 71 and flows out from the first communication hole 61F disposed on the right side.

A bead seal section 41A is disposed around the entire periphery of the first communication hole 61A along the shape of the first communication hole 61A. Similarly, bead seal sections 41B to 41F are disposed around the entire peripheries of the first communication holes 61B to 61F along the shapes of the first communication holes 61B to 61F. In the present example, no elastic bodies 4 are disposed in the bead seal sections 41A to 41F.

In the present example, a bead seal section 41 (bead seal section 41G) is disposed along the outer periphery of the separator assembly 3 and along the shapes of the first communication holes 61A to 61F. A top portion and a bottom portion of the bead seal section 41G are disposed in parallel with a top end and a bottom end of the separator assembly 3. Then, the left and right sides of the bead seal section 41G have zigzag forms routed between the bead seal sections 41A to 41C and between the bead seal sections 41D to 41F.

The elastic body 4 having a circular cross section before compressing load application and having a predetermined length is disposed in each location of the bead seal section 41G where the height after formation is low, that is, the location having an initial bead height lower than the other location. In the case where the diameter of the elastic body 4 is set to, for example, 1.0 mm, a squeeze is desirably set to about 20 to 40%.

In addition, the elastic body 4 is also disposed at a curved portion (R portion) in the bead seal section 41G. Moreover, the elastic body 4 is also disposed at a location of the bead seal section 41G at which the bead seal section 41G and a bead seal section 41J are abutted each other. At a location where the bead seal sections 41 and 41 are abutted each other as described above, the surface pressure tends to decrease and therefore it is preferable to place the elastic body 4 and ensure the surface pressure.

A bead seal section 41H is disposed along the outer periphery of the separator assembly 3 entirely in the peripheral direction. No elastic body 4 is disposed in the bead seal section 41H in the present example.

Further, the second communication hole 65 configured to function as an outlet in order to purge air or in order to discharge the coolant is disposed at a corner of the separator assembly 3. In the present example, the second communication hole 65 has a circular shape in plan view, but may have an elliptic shape or polygonal shape. The number of the second communication holes 65 is not particularly limited. In the present example, two second communication holes 65 are disposed. The second communication hole 65 configured to function as an outlet in order to purge air is a hole for purging air in the coolant. The second communication hole 65 configured to function as an outlet in order to discharge the coolant is a hole for discharging the coolant.

A bead seal section 41I is disposed around the second communication hole 65A along the shape of the second communication hole 65A. The bead seal section 41J is a section connecting the bead seal section 41I with the bead seal section 41G.

A bead seal section 41K is disposed around the second communication hole 65B along the shape of the second communication hole 65B. A bead seal section 41L is a section connecting the bead seal section 41K with the bead seal section 41G.

The elastic body 4A is disposed in the bead seal section 41I. As illustrated in FIG. 5A, the shape of the elastic body 4A before compressing load application is a rounded rectangular shape. Specifically, the elastic body 4A includes one pair of opposed linear portions and one pair of opposed curve portions. The elastic body 4A may have an elliptic shape. As illustrated in FIG. 5B, it is desirable that the elastic body 4A under the compressing load application be squeezed along the shape of the bead seal section 41I and filled in the bead seal section 41I at about 80 to 90% of the bead cross-sectional area.

The squeeze of the elastic body 4A may be set as appropriate, and may be set, for example, within a range of 5 to 20% of the height dimension as appropriate.

The elastic body 4A is disposed in the bead seal section 41K as in the bead seal section 41I. The length of the elastic body 4A may be set as appropriate, and the elastic body 4A may be disposed, for example, over three-fourths of the bead seal section 41I or 41K in a circumferential direction on the outer periphery side of the separators.

Example 2 described above can also produce substantially the same effects as in Example 1. Here, for example, in the case where the seal bead portions 31 (see FIG. 2) forming the bead seal section 41G have a low height after formation (there is a location having an initial bead height lower than that of the other location), the bead seal section 41G may fail to achieve the desired surface pressure because the location acts as a portion with a low reaction force. In addition, for example, at a location where the bead seal sections 41 and 41 are abutted each other, the surface pressure tends to decrease. According to the present example, however, the elastic body 4 having a circular cross section and a predetermined length is disposed in a portion with a low reaction force in the bead seal section 41G, and thereby improves the surface pressure at the portion with the low reaction force.

Then, when a compressing load is applied in a stack direction, the large load tends to act on the second communication hole 65 configured to function as an outlet in order to purge air or in order to discharge the coolant. To address this, for example, the elastic body 4A having a rounded rectangular or elliptic cross section is disposed at a location where the large load acts when the compressing load is applied as in the second communication holes 65 (65A and 65B), so that the load can be prevented from exceeding a predetermined maximum load. In other words, the elastic body 4A can be caused to function as a stopper to prevent the bead seal section 41 (41I or 41K) from being compressed excessively beyond a predetermined maximum compression amount.

It is understood that the foregoing description is that of the preferred embodiments of the invention and that various changes and modifications may be made thereto without departing from the spirit and scope of the invention as defined in the appended claims.

What is claimed is:

1. A separator assembly used for a fuel cell comprising:
   one pair of metal separators joined together and including a bead seal section including one pair of seal bead portions projecting in opposite directions respectively;
   an elastic body disposed in the bead seal section; and
   a first communication hole which extends through the separator assembly in a thickness direction of the separator assembly and which allows a reaction gas or a coolant to flow through the separator assembly,
   wherein the bead seal section is disposed along an outer periphery of the separator assembly and along a shape of the first communication hole, and
   the elastic body of a predetermined length is disposed in the bead seal section.

2. The separator assembly according to claim 1,
   wherein the elastic body has a circular cross-section with the elastic body undergoing no compressive load in a stack direction.

3. The separator assembly according to claim 1,
   wherein the bead seal section includes a first location having a first initial bead height and a second location having a second initial bead height higher than the first initial height, and the elastic body being disposed at the first location.

4. The separator assembly according to claim 1, further comprising:
   a second communication hole extending through the separator assembly in the thickness direction of the separator assembly and configured to function as an outlet in order to purge air or in order to discharge the coolant,
   wherein the elastic body of a predetermined length is disposed in the bead seal section disposed around the second communication hole.

5. The separator assembly according to claim 4,
   wherein the elastic body has an elliptic cross-section or a rounded rectangular cross-section with the elastic body undergoing no compressive load in the stack direction.

6. The separator assembly according to claim 1, further comprising a stopper section arranged side by side with the bead seal section.

7. The separator assembly according to claim 2,
   wherein the bead seal section includes a first location having a first initial bead height and a second location having a second initial bead height higher than the first initial height, and the elastic body being disposed at the first location.

8. The separator assembly according to claim 2, further comprising:
   a second communication hole extending through the separator assembly in the thickness direction of the separator assembly and configured to function as an outlet in order to purge air or in order to discharge the coolant,
   wherein the elastic body of a predetermined length is disposed in the bead seal section disposed around the second communication hole.

9. The separator assembly according to claim 3, further comprising:
 a second communication hole extending through the separator assembly in the thickness direction of the separator assembly and configured to function as an outlet in order to purge air or in order to discharge the coolant,
 wherein the elastic body of a predetermined length is disposed in the bead seal section disposed around the second communication hole.

10. The separator assembly according to claim 7, further comprising:
 a second communication hole extending through the separator assembly in the thickness direction of the separator assembly and configured to function as an outlet in order to purge air or in order to discharge the coolant,
 wherein the elastic body of a predetermined length is disposed in the bead seal section disposed around the second communication hole.

11. The separator assembly according to claim 8,
 wherein the elastic body has an elliptic cross-section or a rounded rectangular cross-section with the elastic body undergoing no compressive load in the stack direction.

12. The separator assembly according to claim 9,
 wherein the elastic body has an elliptic cross-section or a rounded rectangular cross-section with the elastic body undergoing no compressive load in the stack direction.

13. The separator assembly according to claim 10,
 wherein the elastic body has an elliptic cross-section or a rounded rectangular cross-section with the elastic body undergoing no compressive load in the stack direction.

14. The separator assembly according to claim 2, further comprising a stopper section arranged side by side with the bead seal section.

15. The separator assembly according to claim 3, further comprising a stopper section arranged side by side with the bead seal section.

16. The separator assembly according to claim 7, further comprising a stopper section arranged side by side with the bead seal section.

17. The separator assembly according to claim 4, further comprising a stopper section arranged side by side with the bead seal section.

18. The separator assembly according to claim 8, further comprising a stopper section arranged side by side with the bead seal section.

19. The separator assembly according to claim 9, further comprising a stopper section arranged side by side with the bead seal section.

20. The separator assembly according to claim 10, further comprising a stopper section arranged side by side with the bead seal section.

* * * * *